United States Patent
Poppe et al.

(10) Patent No.: US 8,034,872 B2
(45) Date of Patent: Oct. 11, 2011

(54) OLIGOMERS AND POLYMERS CONTAINING HYDROLYSATES AND/OR CONDENSATES OF EPOXIDE GROUPS AND SILANE GROUPS, METHOD FOR THEIR PRODUCTION AND USE THEREOF

(75) Inventors: Andreas Poppe, Sendenhorst (DE); Wilfried Stübbe, Greven (DE); Elke Westhoff, Steinfurt (DE); Manuela Niemeier, Drensteinfurt (DE); Dunja Köppen, Ascheberg (DE)

(73) Assignee: BASF Coatings GmbH, Munster (DE)

( * ) Notice: Subject to any disclaimer, the term of this patent is extended or adjusted under 35 U.S.C. 154(b) by 875 days.

(21) Appl. No.: 10/595,519

(22) PCT Filed: Nov. 8, 2004

(86) PCT No.: PCT/EP2004/052920
§ 371 (c)(1),
(2), (4) Date: Jan. 13, 2009

(87) PCT Pub. No.: WO2005/049734
PCT Pub. Date: Jun. 2, 2005

(65) Prior Publication Data
US 2010/0137503 A1    Jun. 3, 2010

(30) Foreign Application Priority Data

Nov. 17, 2003   (DE) .................... 103 53 507

(51) Int. Cl.
*C08F 230/08*     (2006.01)
*C08L 33/08*      (2006.01)
(52) U.S. Cl. ........ 524/560; 524/401; 524/402; 524/413; 524/497; 524/457; 524/493
(58) Field of Classification Search .......... 524/560, 524/401, 413, 402, 493, 497, 457
See application file for complete search history.

(56) References Cited

U.S. PATENT DOCUMENTS

| 4,772,672 | A    | 9/1988  | Isozaki          |          |
|-----------|------|---------|------------------|----------|
| 6,008,285 | A    | 12/1999 | Kasemann et al.  |          |
| 6,228,921 | B1   | 5/2001  | Kasemann et al.  |          |
| 6,572,693 | B1   | 6/2003  | Wu et al.        |          |
| 6,620,514 | B1   | 9/2003  | Arpac et al.     |          |
| 6,676,740 | B2 * | 1/2004  | Matsumura et al. | 106/287.1|
| 6,846,568 | B2 * | 1/2005  | Yamaya et al.    | 428/447  |
| 6,905,772 | B2 * | 6/2005  | Shoup et al.     | 428/447  |

FOREIGN PATENT DOCUMENTS

| DE | 3716417 A1    | 11/1987 |
| DE | 19540623 A1   | 5/1997  |
| DE | 19719948 A1   | 11/1998 |
| DE | 19726829 A1   | 1/1999  |
| DE | 19910876 A1   | 10/2000 |
| DE | 19940857 A1   | 3/2001  |
| EP | 1179575 A3    | 7/2002  |
| WO | WO9952964 A3  | 10/1999 |
| WO | WO9954412 A1  | 10/1999 |
| WO | WO0022052 A1  | 4/2000  |
| WO | WO0035599 A1  | 6/2000  |
| WO | 03/016411 A1  | 2/2003  |

OTHER PUBLICATIONS

International Preliminary Report on Patentability for International Application No. PCT/EP2004/052920 dated Sep. 19, 2006.
International Search Report of International Application No. PCT/EP2004/052920 dated Mar. 31, 2005.

* cited by examiner

*Primary Examiner* — Satya Sastri
(74) *Attorney, Agent, or Firm* — Cantor Colburn LLP

(57) ABSTRACT

Hydrolysates and/or condensates of epoxy- and silane-functional oligomers and polymers, prepared by hydrolyzing and/or condensing at least one oligomer and/or polymer (A) containing at least one epoxide group (a1) and at least one hydrolyzable silane group (a2); and also (meth)acrylate copolymers (A) containing lateral and/or terminal epoxide groups (a1) and lateral and/or terminal hydrolyzable silane groups (a2), in a molar ratio (a1): (a2) of from 15:1 to 1: 1.5, processes for preparing them, and their use.

21 Claims, No Drawings

_US 8,034,872 B2_

OLIGOMERS AND POLYMERS CONTAINING HYDROLYSATES AND/OR CONDENSATES OF EPOXIDE GROUPS AND SILANE GROUPS, METHOD FOR THEIR PRODUCTION AND USE THEREOF

This application is a National Phase Application of PCT/EP2004/052920, filed 8Nov. 2004, which claims priority to DE 103 53 507.1 filed 17 Nov. 2003.

BACKGROUND OF THE INVENTION

The present invention relates to new hydrolysates and/or condensates of epoxy- and silane-functional oligomers and polymers. The present invention also relates to a new process for preparing hydrolysates and/or condensates of epoxy- and silane-functional oligomers and polymers. The present invention further relates to the use of the new hydrolysates and/or condensates of epoxy- and silane-functional oligomers and polymers and of the hydrolysates and/or condensates of epoxy- and silane-functional oligomers and polymers prepared by the new process as new curable compositions or for preparing new curable compositions. The present invention relates not least to the use of the curable compositions for producing new cured compositions, especially coatings and paint systems, and also moldings, especially optical moldings, and self-supporting sheets.

Curable compositions based on hydrolysates and/or condensates of epoxy-functional silanes are known from, for example, patent applications EP 1 179 575 A 2, WO 00/35599 A, WO 99/52964 A, WO 99/54412 A, DE 197 26 829 A 1 or DE 195 40 623 A 1. They serve in particular to produce highly scratch-resistant coatings.

Curable compositions based on silanes which contain at least one olefinically unsaturated group, in particular a vinyl group or a methacrylate or acrylate group, such as vinyltrimethoxysilane or methacryloyloxypropyltrimethoxysilane (MPTS), for example, are known from patent applications WO 00/22052 A, WO 99/54412 A, DE 199 10 876 A 1 or DE 197 19 948 A 1

According to international patent application WO 99/54412 A, for example, MPTS is hydrolyzed and/or condensed in the presence of gamma-AlO(OH) nanoparticles. The resulting gel is evaporated down and used as a powder clearcoat material. The applied powder clearcoat material is cured thermally.

According to patent applications WO 00/22052 A, DE 199 10 876 A 1 or DE 197 19 948 A 1, for example $SiO_2$ nanoparticles are silanized with MPTS and mixed with polyfunctional acrylates, such as trimethylolpropane triacrylate The resulting suspensions can be polymerized with UV radiation or electron beams.

Thermally curable compositions based on copolymers containing epoxide groups and hydrolyzable silane groups are known from American patent U.S. Pat. No. 4,772,672 A. The curable compositions must be cured using aluminum or zirconium chelate complexes. The curable compositions can have from 0.1 to 1% by weight of water added to them, based on their respective total amount, in order to accelerate the cure.

An essential objective of these developments is to provide curable compositions for producing cured compositions, especially coatings and paint systems, and also moldings, especially optical moldings, and self-supporting sheets.

The curable compositions ought to be easy to prepare with great reproducibility and for use in the liquid state ought to have a solids content >30% by weight without detriment thereby to their transportability, storage stability or processing properties, in particular their application properties The curable compositions ought to give cured compositions, especially coatings and paint systems, more particularly clearcoats, moldings, especially optical moldings, and self-supporting sheets which are highly scratch-resistant and chemicals-stable. In particular it ought to be possible to produce the coatings and paint systems, more particularly the clearcoats, in film thicknesses>40 µm without the appearance of stress cracks. This is an essential prerequisite for the use of the coatings and paint systems, especially the clearcoats, in the technologically and esthetically particularly demanding segment of automotive OEM finishing. In this context they are required in particular to exhibit a particularly high carwash resistance, manifested in the AMTEC carwash test, which is relevant to practice, by a residual gloss (20° to DIN 67530>70% of the original gloss.

The existing curable and cured compositions are unable, however, to meet this profile of requirements to its full extent.

It is an object of the present invention to provide new materials containing epoxide groups and silane groups which allow the production of new curable and cured compositions which do meet the profile of requirements depicted above to its full extent. The new epoxy-functional and silane-functional materials ought, furthermore, to be easy to prepare with very great reproducibility, ought not to pose any environmental problems, and ought consequently not to require any approval under chemicals law.

SUMMARY OF THE INVENTION

The invention accordingly provides the new hydrolysates and/or condensates of epoxy- and silane-functional oligomers and polymers which are preparable by hydrolyzing and/or condensing at least one oligomer and/or polymer (A) containing at least one epoxide group (a1) and at least one hydrolyzable silane group (a2)

The new hydrolysates and/or condensates of oligomers and polymers (A) containing epoxide and silane groups (a1) and (a2) are referred to below as "hydrolysates and/or condensates of the invention".

The invention additionally provides the new process for preparing the hydrolysates and/or condensates of the invention, which involves hydrolyzing and/or condensing the oligomers and/or polymers (A) at a pH<7 and which is referred to below as "process of the invention".

The invention provides not least for the new use of the hydrolysates and/or condensates of the invention and of the hydrolysates and/or condensates prepared by the process of the invention as curable compositions or for preparing them, this being referred to below as "use in accordance with the invention".

Additional subject matter of the invention will emerge from the description.

DETAILED DESCRIPTION OF THE INVENTION

In the fight of the prior art it was surprising and unforeseeable for the skilled worker that the object on which the present invention was based could be achieved by means of the hydrolysates and/or condensates of the invention, the process of the invention, and the use in accordance with the invention.

A particular surprise was that the hydrolysates and/or condensates of the invention were preparable with particular ease and very good reproducibility, in particular by means of the process of the invention, it being possible to use standard commercial starting products, and that they posed no environmental problems and therefore also required no approval under chemicals law.

An additional surprise was that the hydrolysates and/or condensates of the invention were outstandingly suitable as new curable compositions or as starting materials for preparing new curable compositions.

The curable compositions of the invention were preparable easily and with very good reproducibility and when used in the liquid state could be adjusted to solids contents >30% by weight without detriment thereby to their very good transportability, storage stability, and processing properties, in particular their application properties. Surprisingly they could be cured fully and rapidly even without aluminum or zirconium chelate complexes.

The curable compositions of the invention gave new cured compositions, especially coatings and paint systems, more particularly clearcoats, moldings, especially optical moldings, and self-supporting sheets which were highly scratch-resistant and chemicals-stable. In particular it was possible to produce the coatings and paint systems of the invention, more particularly the clearcoats, even in film thicknesses>40 μm without the occurrence of stress cracks. Consequently the coatings and paint systems of the invention, especially the clearcoats, could be used in the technologically and esthetically particularly demanding segment of automotive OEM finishing. In this context they were distinguished in particular by an especially high carwash resistance and scratch resistance, something which could be underscored on the basis of the AMTEC carwash test which is relevant for practice, by a residual gloss) (20° to DIN 67530>70% of the original gloss.

The hydrolysates and/or condensates of the invention are preparable by hydrolyzing and/or condensing oligomers and/or polymers (A) containing epoxide groups and hydrolyzable silane groups, preferably in the context of what is known as the sol-gel process. Its basic reactions can be illustrated with reference to the tetraorthosilicates. The latter are hydrolyzed, and hydrolyzed and/or condensed, optionally in the presence of a cosolvent:

Hydrolysis

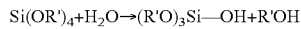

Hydrolysis and/or condensation

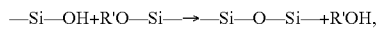

where R' can be an alkyl group, such as methyl or ethyl. The reactions are catalyzed using acids, bases or fluoride ions.

The oligomers (A) contain on average more than 2 and not more than 15 incorporated monomer units Generally speaking, the polymers (A) contain more than 10, preferably more than 15, incorporated monomer units.

The hydrolysates and/or condensates of the invention are in each case preparable from at least one, especially one, oligomer (A) or polymer (A). For particular applications, however, it is also possible to use mixtures of at least two different oligomers (A), polymers (A) or oligomers and polymers (A).

The oligomers and polymers (A) contain in each case at least one epoxide group (a1) and at least one silane group (a2) which is hydrolyzable in the aforementioned sense. They preferably contain on average at least two, in particular at least three, epoxide groups (a1) and at least two, in particular at least three, hydrolyzable silane groups (a2). These can be terminal and/or lateral epoxide groups (a1) and hydrolyzable silane groups (a2).

The oligomers and polymers (A) can have a linear, star-shaped or dendrimeric or comb structure. These structures may be present in combination with one another within one oligomer or polymer (A). The monomer units can be distributed randomly, in alternation or in blocks, it being possible for these distributions to be present in combination with one another within one oligomer or polymer (A).

The number-average and mass-average molecular weights and the polydispersity of the molecular weight of the oligomers and polymers (A) may vary widely and are guided by the requirements of the case in hand. The number-average molecular weight is preferably from 800 to 3000, more preferably from 1000 to 2500, and in particular from 1000 to 2000 daltons. The mass-average molecular weight is preferably from 1000 to 8000, more preferably from 1500 to 6500, and in particular from 1500 to 6000 daltons. The polydispersity is preferably <10, more preferably <8, and in particular <5.

The oligomers and polymers (A) can originate from any of those classes of polymers in whose preparation and thereafter the epoxide groups (a1) and the hydrolyzable silane groups (a2) are not reacted. The skilled worker is therefore able easily to select the suitable classes of polymer on the basis of his or her general art knowledge. The oligomers and polymers (A) are preferably addition polymers, especially addition copolymers of olefinically unsaturated monomers.

The epoxide groups (a1) are bonded covalently to the main chain or main chains of the oligomers and polymers (A) by way of linking organic groups (G1) Here it is possible for one epoxide group (a1) to be linked to the main chain via one divalent linking organic group (G1) or for at least two epoxide groups (a1) to be linked to the main chain via one at least trivalent linking organic group (G1). Preferably one epoxide group (a1) is linked to the main chain via one divalent linking organic group (G1)

The divalent linking organic groups (G1) preferably comprise or consist of at least one, especially one, at least divalent, especially divalent, group (G11), selected from the group consisting of substituted and unsubstituted, preferably unsubstituted, branched and unbranched, preferably unbranched, cyclic and noncyclic, preferably noncyclic, alkyl, alkenyl, and alkynyl groups, especially alkyl groups, and also substituted and unsubstituted, preferably unsubstituted, aryl groups.

The divalent group (G11) is in particular an unbranched, noncyclic, unsubstituted divalent alkyl group having 1 to 10, preferably 2 to 6, and in particular 1 to 4 carbon atoms, such as a methylene, ethylene, trimethylene or tetramethylene group.

Preferably the divalent linking organic groups (G1) additionally include at least one, especially one, at least divalent, especially divalent, linking functional group (G12), preferably selected from the group consisting of ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, hydrazide, urethane, urea, thiourea, carbonyl, thiocarbonyl, sulfone, and sulfoxide groups, especially carboxylate groups.

Examples of suitable substituents are halogen atoms, especially fluorine atoms and chlorine atoms, nitrile groups, nitro groups or alkoxy groups. The above-described groups (G1) and (G11) are preferably unsubstituted.

The epoxide groups (a1) are preferably linked to the main chain via a group (G11) which in turn is linked to the main chain via a group (G12), more preferably in accordance with the general formula I:

$$-(-G12-)-(G11-)-\text{epoxide} \quad (I).$$

In particular the group of the general formula I used is

$$-C(O)-O-CH_2\text{-epoxide} \quad (I1).$$

The hydrolyzable silane groups (a1) can have different structures. They are preferably selected from the group consisting of hydrolyzable silane groups (a2) of the general formula

$$-SiR_mR^1{}_n \quad (II).$$

In the general formula II the indices and variables are defined as follows:

R is a monovalent hydrolyzable atom or monovalent hydrolyzable group;

$R^1$ is a monovalent, nonhydrolyzable radical;

m is an integer from 1 to 3, preferably 3, and n is 0 or 1 or 2, preferably 0 or 1, with the proviso that m+n=3.

Examples of suitable monovalent hydrolyzable atoms R are hydrogen, fluorine, chlorine, bromine, and iodine.

Examples of suitable monovalent hydrolyzable radicals R are hydroxyl groups, amino groups —NH$_2$, and groups of the general formula III:

$$R^1-X- \quad (III),$$

in which the variables are defined as follows:

X is an oxygen atom, sulfur atom, carbonyl group, thiocarbonyl group, carboxyl group, thiocarboxylic S-ester group, thiocarboxylic O-ester group or amino group —NH— or —NR$^1$—, preferably an oxygen atom; and $R^1$ is a monovalent organic radical.

The monovalent organic radical $R^1$ comprises or consists of at least one group (G2) selected from the group consisting of substituted and unsubstituted, preferably unsubstituted, branched and unbranched, preferably unbranched, cyclic and noncyclic, preferably noncyclic, alkyl, alkenyl, and alkynyl groups, preferably alkyl groups, and also substituted and unsubstituted aryl groups, especially unsubstituted, unbranched, noncyclic alkyl groups.

Examples of suitable substituents are those mentioned above.

If the radical $R^1$ is composed of a group (G2) it is monovalent.

Where the radical $R^1$ includes a group (G2) it is at least divalent, in particular divalent, and is linked directly to —X—. The radical $R^1$ may further include at least one, especially one, of the above-described groups (G12).

Where the radical $R^1$ includes at least two groups (G2), at least one of them is at least divalent, especially divalent, and linked directly to —X—. This group (G2) linked directly to —X— is linked to at least one further group (G2). This group (G2) linked directly to —X— is preferably linked to the other group (G2) via one group (G12) or to the other groups (G2) via at least two groups (G12).

The radical $R^1$ is preferably composed of a group (G2). In particular the radical $R^1$ is selected from the group consisting of methyl, ethyl, propyl, and butyl.

The hydrolyzable silane groups (a2) are selected in particular from the group consisting of methyldiethoxysilyl, trimethoxysilyl, triethoxysilyl, tripropoxysilyl, and tributoxysilyl, especially trimethoxysilyl and triethoxysilyl.

The hydrolyzable silane groups (a2) are bonded covalently to the main chain or main chains of the oligomers and polymers (A) preferably via the above-described linking organic groups (G1). In this case one hydrolyzable silane group (a2) may be linked to the main chain via one divalent linking organic group (G1) or else at least two hydrolyzable silane groups (a2) may be linked to the main chain via an at least trivalent linking organic group (G1). Preferably one hydrolyzable silane group (a2) is linked to the main chain via one divalent linking organic group (G1).

Preferably here again, the monovalent linking organic groups (G1) comprise or consist of at least one, especially one, of the above-described at least divalent, especially divalent, groups (G11). More preferably the divalent linking organic groups (G1) further include at least one, especially one, of the above-described at least divalent, especially divalent, linking functional groups (G12).

The silane groups (a2) are preferably linked to the main chain of the oligomers and polymers (A) via one divalent linking group (G11) which is in turn linked to said main chain via one divalent linking functional group (G12) in accordance with the general formula (IV):

$$(-G12-)-(G11)-SiR_mR^1{}_n \quad (IV),$$

in which the indices and variables are as defined above. With very particular preference the following groups of the general formula IV are used:

$$-C(O)-O-(-CH_2-)_2-Si(OCH_3)_3 \quad (IV1),$$

$$-C(O)-O-(-CH_2-)_3-Si(OCH_3)_3 \quad (IV2),$$

$$-C(O)-O-(-CH_2-)_2-Si(OC_2H_5)_3 \quad (IV3),$$

$$-C(O)-O-(-CH_2-)_3-Si(OC_2H_5)_3 \quad (IV4),$$

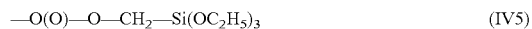
$$-O(O)-O-CH_2-Si(OC_2H_5)_3 \quad (IV5)$$

and

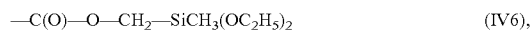
$$-C(O)-O-CH_2-SiCH_3(OC_2H_5)_2 \quad (IV6),$$

especially (IV4).

The molar ratio of epoxide groups (a1) to hydrolyzable silane groups (a2) in the oligomers and polymers (A) may vary widely. It is preferably from 1.5:1 to 1:1.5, more preferably from 1.3:1 to 1:1.3 and in particular from 1.1:1 to 1:1.1.

Of very particular advantage are the (meth)acrylate copolymers (A) containing lateral and/or terminal epoxide groups (a1) and lateral and/or terminal, hydrolyzable silane groups (a2) of the general formula II:

$$-SiR_mR^1{}_n \quad (II),$$

in which the indices and variables are as defined above, in a molar ratio (a1):(a2) of from 1.5:1 to 1:1.5, preferably from 1.3:1 to 1:1.3, and in particular from 1.1:1 to 1:1.1. These (meth)acrylate copolymers (A) of the invention yield especially advantageous hydrolysates and/or condensates of the invention.

Besides the above-described epoxide groups (a1) and silane groups (a2) the oligomers and polymers (A) may additionally include further lateral and/or terminal groups (a3). It is essential that the groups (a3) neither react with the epoxide groups (a1) and silane groups (a2) nor interfere with the progress of the hydrolysis and/or condensation Examples of suitable groups (a3) are fluorine atoms, chlorine atoms, nitrile groups, nitro groups, alkoxy groups, polyoxyalkylene groups, or the above-described monovalent radicals $R^1$, especially aryl groups, alkyl groups, and cycloalkyl groups. With the aid of this group (a3) it is possible to vary the profile of properties of the oligomers and polymers (A) and hence of the hydrolysates and/or condensates of the invention broadly in an advantageous way.

The oligomers and polymers (A) are preparable by copolymerizing at least one, especially one, monomer (a1) containing at least one, especially one, epoxide group (a1) with at least one, especially one, monomer (a2) containing at least one, especially one, silane group (a2). The monomers (a2) and (a3) may further be copolymerized with at least one monomer (a3) containing at least one group (a3).

Particular advantages result if the monomers (a1) and (a2) are copolymerized with one another in a molar ratio (a1):(a2) of from 1.5:1 to 1:1.5, preferably from 1.3:1 to 1:1.3, and in particular from 1.1:1 to 1:1.1. Very particular advantages are obtained if in this case the result is the above-described molar ratio of epoxide groups (a1) to hydrolyzable silane groups (a2) in the oligomers and polymers (A).

The monomers (a1), (a2), and (a3) preferably include at least one, especially one, olefinically unsaturated group.

Examples of suitable olefinically unsaturated groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, preferably methacrylate groups and acrylate groups, in particular methacrylate groups.

Examples of suitable monomers (a1) are known from American patent U.S. Pat. No. 4,772,672 A, column 5 line 7 to column 6 line 66. An example of an especially suitable monomer (a1) is glycidyl methacrylate.

Examples of suitable monomers (a2) are known from American patent U.S. Pat. No. 4,772,672 A, column 2 line 52 to column 5 line 5. An example of an especially suitable monomer (a2) is methacryloyloxypropyltrimethoxysilane (MPTS), which is sold under brand name Dynasilan® MEMO by Degussa, or methacryloyloxymethyltriethoxysilane or methacryloyloxymethylmethyldiethoxysilane, which are sold under the brand name Geniosil® XL 34 and Geniosil® XL 36 by Wacker Examples of suitable monomers (a3) are described in international patent application WO 03/016411, page 24 line 9 to page 28 line 8.

The oligomers and polymers (A) are preferably preparable conventionally by free-radical copolymerization of the monomers (a1) and (a2) and also, where used, (a3), preferably without solvent or in solution, in particular in solution.

The hydrolysates and/or condensates of the invention are prepared preferably by means of the process of the invention.

For this purpose the above-described oligomers and/or polymers (A) are preferably hydrolyzed and/or condensed at a pH<7. The hydrolysis and/or condensation takes place in a sol-gel process by the reaction with water in the presence of an organic or inorganic acid, preferably an organic acid, especially acetic acid. The hydrolysis and/or condensation is conducted preferably at from −10 to +50, more preferably from 0 to +40, and in particular from +10 to +30° C.

The hydrolysis and/or condensation can be conducted in the presence of conventional hydrolyzable silanes of low molecular mass and/or hydrolyzable metal alkoxides, as described for example in German patent application DE 199 40 857 A 1, and/or nanoparticles, especially nanoparticles.

The nanoparticles are preferably selected from the group consisting of metals, compounds of metals, and organic compounds, preferably compounds of metals.

The metals are preferably selected from main groups three to five and transition groups three to six and also one and two of the Periodic System of the Elements and also from the lanthanides, more preferably from the group consisting of boron, aluminum, gallium, silicon, germanium, tin, arsenic, antimony, silver, zinc, titanium, zirconium, hafnium, vanadium, niobium, tantalum, molybdenum, tungsten, and cerium. In particular aluminum and silicon are used.

The compounds of the metals are preferably oxides, oxide hydrates, sulfates, hydroxides or phosphates, especially oxides, oxide hydrates, and hydroxides.

Examples of suitable organic compounds are lignins and starches.

The nanoparticles preferably have a primary particle size <50 nm, more preferably from 5 to 50 nm, in particular from 5 to 30 nm.

The hydrolysates and/or condensates of the invention, especially those prepared in the presence of nanoparticles, can be used per se as curable compositions.

It is additionally possible to use the hydrolysates and/or condensates of the invention, especially those produced in the presence of nanoparticles, for preparing curable compositions.

Surprisingly it is possible for the above-described nanoparticles, particularly when stabilized cationically, to be used as catalysts for the crosslinking of the hydrolysates and/or condensates of the invention and/or of the curable compositions of the invention, even when only added subsequently thereto.

As catalysts it is additionally possible to add to the hydrolysates and/or condensates of the invention and/or to the curable compositions of the invention compounds of metals with at least one organic, preferably nonaromatic compound capable of forming chelate ligands. The compounds which form chelate ligands are organic compounds having at least two functional groups able to coordinate to metal atoms or metal ions. These functional groups are usually electron donors, which give up electrons to metal atoms or metal ions as electron acceptors. Suitable in principle are all organic compounds of the type stated, provided they do not adversely affect, let alone prevent entirely, the crosslinking of the curable compositions of the invention to cured compositions of the invention. Examples of suitable organic compounds are dimethylglyoxime or compounds containing carbonyl groups in positions 1 and 3, such as acetylacetone or ethyl acetoacetate. For further details refer to Römpp Chemie Lexikon, Georg Thieme Verlag, Stuttgart, 1989, volume 1, page 634. As catalysts it is also possible to use the aluminum and zirconium chelate complexes as described in, for example, American patent U.S. Pat. No. 4,772,672 A, column 8 line 1 to column 9 line 49. It is, however, a particular advantage of the curable compositions of the invention that they can be cured rapidly and completely even without the use of chelate complexes.

It is a further possibility to add, to the hydrolysates and/or condensates of the invention and/or to the curable compositions of the invention, conventional catalysts for the crosslinking of the epoxide groups, such as Lewis acids, aluminum compounds or tin compounds of amines or heterocycles, as described in, for example, the book by Bryan Ellis, "Chemistry and Technology of Epoxy Resins", University of Sheffield, Blackie Academic & Professional.

It is also possible to add to them conventional, typical coatings constituents Examples of suitable constituents are described in, for example, international patent application WO 03/016411, page 14 line 9, to page 35 line 31.

The preparation of the curable compositions of the invention has no particular features as far as its method is concerned but can instead be conducted using the apparatus and methods described in international patent application WO 03/016411, page 36 lines 13 to 20.

The curable compositions of the invention comprise conventional organic solvents (cf. international patent application WO 03/016411, page 35 lines 12 to 14) and also, preferably, water. This is a particular advantage of the liquid curable compositions of the invention: the fact that they can have a solids content >30% by weight without detriment thereby to their very good transportability, storage stability, and processing properties, in particular their application properties.

The curable compositions of the invention serve for producing the cured compositions of the invention. In this context they are used with preference as pigmented and unpigmented coating materials, especially clearcoat materials, and also as starting materials for moldings, especially optical moldings, and self-supporting sheets.

The cured compositions of the invention are preferably pigmented and unpigmented coatings and paint systems, more preferably transparent, especially clear, clearcoats, moldings, especially optical moldings, and self-supporting sheets. With very particular preference the cured compositions of the invention are clearcoats, both alone and as part of multicoat color and/or effect paint systems, on conventional substrates (cf. in this respect international patent application WO 03/016411, page 41 line 6 to page 43 line 6 in conjunction with page 44 line 6 to page 45 line 6).

The production of the cured compositions of the invention from the curable compositions of the invention has no particular features as far as this method is concerned but is instead conducted using conventional apparatus and methods which are typical for the particular cured composition of the invention.

The curable coating materials of the invention in particular are applied to substrates by means of the conventional apparatus and methods described in international patent application WO 03/016411, page 37 fines 4 to 24.

The curable compositions of the invention can be cured as described in international patent application WO 03/016411, page 38 line 1 to page 41 line 4.

The curable compositions of the invention provide new cured compositions, especially coatings and paint systems, more particularly clearcoats, moldings, especially optical moldings, and self-supporting sheets, which are highly scratch-resistant and chemicals-stable. In particular the coatings and paint systems of the invention, more particularly the clearcoats, can be produced even in film thicknesses>40 μm without the occurrence of stress cracks.

The cured compositions of the invention are therefore outstandingly suitable for use as decorative, protective and/or effect-imparting, highly scratch-resistant coatings and paint systems on bodywork of means of transport of any kind (especially means of transport operated by muscle power, such as cycles, carriages or railroad trolleys, aircraft, such as airplanes, helicopters or airships, floating structures, such as ships or buoys, rail vehicles, and motor vehicles, such as motorcycles, buses, trucks or automobiles) or of parts thereof; on the interior and exterior of buildings; on furniture, windows, and doors; on polymeric moldings, particularly those of polycarbonate, especially CDs and windows; on small industrial parts, on coils, containers, and packaging; on white goods; on sheets; on optical, electrical, and mechanical components; and on hollow glassware and articles of everyday use.

The coatings and paint systems of the invention, particularly the clearcoats, can be employed in particular in the technologically and esthetically particularly demanding segment of automotive OEM finishing In that utility they are distinguished in particular by an especially high carwash resistance and scratch resistance, as can be underscored on the basis of the AMTEC carwash test which is relevant to practical use, by a residual gloss (20°) to DIN 67530>70% of the original gloss.

EXAMPLES

Example 1

The Preparation of a Methacrylate Copolymer (A1)

A three-necked flask of glass equipped with stirrer, reflux condenser, gas inlet and two feed vessels was charged with 669.5 parts by weight of ethoxypropanol. The initial charge was heated with stirring to 130° C. under a nitrogen atmosphere. Subsequently the first feed stream, consisting of 377 parts by weight of glycidyl methacrylate, 658.5 parts by weight of methacryloyloxypropyltrimethoxysilane (Dynasilan® MEMO) and 48.25 parts by weight of 1,1'-diphenylethylene, and the second feed stream, consisting of 11.75 parts by weight of tert-butyl peroxy-2-ethylhexanoate and 134 parts by weight of ethoxypropanol, were subsequently metered slowly into the initial charge, beginning simultaneously, with stirring. While the first feed stream was metered in over two hours, the second feed stream was metered in over 2.5 hours. The resulting reaction mixture was postpolymerized with stirring at 130° C. for five hours.

The resultant methacrylate copolymer (A1) was characterized by gel permeation chromatography (solvent: tetrahydrofuran; internal standard: polystyrene). The following figures were obtained for molecular weight and polydispersity:

Mass-average molecular weight: 3967 daltons

Number-average molecular weight: 1721 daltons

Polydispersity of the molecular weight: 2.3.

Example 2

The Preparation of a Methacrylate Copolymer (A2)

A three-necked flask of glass equipped with stirrer, reflux condenser, gas inlet and two feed vessels was charged with 150 parts by weight of ethoxypropanol. The initial charge was heated with stirring to 130° C. under a nitrogen atmosphere. Subsequently the first feed stream, consisting of 70.36 parts by weight of glycidyl methacrylate, 122.93 parts by weight of methacryloyloxypropyltrimethoxysilane, 0.7 part by weight of 2,5-dihydrofuran and 0.2 part by weight of 1,1'-diphenylethylene, and the second feed stream, consisting of 21.02 parts by weight of tert-butyl peroxy-2-ethylhexanoate, were subsequently metered slowly into the initial charge, beginning simultaneously, with stirring. While the first feed stream was metered in over two hours, the second feed stream was metered in over 2.5 hours, The resulting reaction mixture was postpolymerized with stirring at 130° C. for five hours.

The resultant methacrylate copolymer (A2) was characterized by gel permeation chromatography (solvent: tetrahydrofuran; internal standard: polystyrene). The following figures were obtained for molecular weight and polydispersity:

Mass-average molecular weight: 3960 daltons
Number-average molecular weight: 1701 daltons
Polydispersity of the molecular weight: 2.3.

Preparation Example 1

The Preparation of Cationically Stabilized Nanoparticles 2.78 parts by weight of boehmite nanoparticles (Disperal® P 3 from Sasol Germany) were added with stirring to a mixture of 25 parts by weight of 1N acetic acid and 2.5 parts by weight of deionized water. The resultant mixture was treated in an ultrasound bath for three minutes until the boehmite nanoparticles had dissolved.

Preparation Example 2

The Preparation of Cationically Stabilized Nanoparticles

Preparation example 1 was repeated but replacing the 1N acetic acid by 0.1N acetic acid.

Example 3

The Preparation of Clearcoat Materials 3.1 to 3.5 and Production of Clearcoats 3.1 to 3.5

General Preparation Instructions:

A round-bottomed glass flask equipped with a magnetic stirrer was charged with the 10% strength by weight nanoparticle solution of preparation example 1 or that of preparation example 2. To this initial charge there were added the methacrylate copolymer (A1) from example 1 and deionized water. The resulting reaction mixture was stirred at room temperature for an hour. Then isopropanol was added and the reaction mixture obtained in this way was stirred at room temperature for four hours, During this time the reaction mixture, which originally had a milky turbidity, became clear and a translucent clearcoat material was formed.

Table 1 gives an overview of the material composition of the clearcoat materials 3.1 to 3.5 prepared in accordance with these general preparation instructions. They were readily transportable and storage-stable.

TABLE 1

The material composition of the clearcoat materials 3.1 to 3.5

| | Parts by weight in the clearcoat material: | | | | |
|---|---|---|---|---|---|
| Constituent | 3.1 | 3.2 | 3.3 | 3.4 | 3.5 |
| Nanoparticle solution from preparation example 1 | 10.5 | 5.25 | 3.5 | — | — |
| Nanoparticle solution from preparation example 2 | — | — | — | 6.13 | 7.0 |
| Solution of the methacrylate copolymer (A1) from example 1 | 8.75 | 8.75 | 8.75 | 8.75 | 8.75 |
| Water | 5.53 | 4.42 | 4.42 | 3.48 | 1.77 |
| Isopropanol | 5.53 | 4.42 | 4.42 | 13.99 | 15.71 |

Clearcoat materials 3.1 to 3.5 were applied pneumatically using gravity-feed cup-type guns to steel panels which had previously been coated with—above one another in the order stated—an electrocoat, a surfacer coat, and a black aqueous basecoat. The wet film thickness of the applied clearcoat films 3.1 to 3.5 was chosen so that the cured clearcoats had a dry film thickness of 40 μm. The applied clearcoat films 3.1 to 3.5 were flashed off at room temperature for 10 minutes and cured thermally at 140° C. for 22 minutes. Forced air ovens from Heraeus were used for the thermal cure.

This gave clear, high-gloss clearcoats 3.1 to 3.5 which showed very good leveling and were free from stress cracks and surface defects such as craters. The hardness, flexibility, and scratch resistance of the clearcoats 3.1 to 3.5 were investigated.

The steel wool scratch test was carried out using a hammer to DIN 1041 (weight without shaft: 800 g; shaft length: 35 cm). The test panels were stored at room temperature for 24 hours prior to the test.

The flat side of the hammer was wrapped with one ply of steel wool and fastened at the raised sides using tesakrepp tape. The hammer was applied at right angles to the clearcoats. The head of the hammer was guided, without being tipped and without additional physical force, in a track over the surface of the clearcoat.

For each test 10 back-and-forth strokes were performed by hand. After each of these individual tests the steel wool was replaced.

Following exposure, the test areas were cleaned with a soft cloth to remove the residues of steel wool. The test areas were evaluated visually under artificial light and rated as follows:

| Rating | Damage |
|---|---|
| 1 | none |
| 2 | slight |
| 3 | moderate |
| 4 | moderate to medium |
| 5 | severe |
| 6 | very severe |

Evaluation took place immediately after the end of the test.

Table 2 gives an overview of the results. They underscore the fact that the clearcoats 3.1 to 3.5 were hard, flexible, and highly scratch-resistant.

TABLE 2

The hardness, flexibility, and scratch resistance of clearcoats 3.1 to 3.5

| | Clearcoat material: | | | | |
|---|---|---|---|---|---|
| Test | 3.1 | 3.2 | 3.3 | 3.4 | 3.5 |
| Universal hardness at 25.6 mN [N/mm$^2$] | 92 | 79.2 | 77.8 | 77.8 | 92 |
| Relative elastic resilience (%) | 62.4 | 60.2 | 61.7 | 61.7 | 62.4 |
| Steel wool scratch test (rating) | 1-2 | 1-2 | 1-2 | 1-2 | 1-2 |

Example 4

The Preparation of Clearcoat Materials 4.1 to 4.5 and Production of Clearcoats 4.1 to 4.5

A round-bottomed flask equipped with a magnetic stirrer was charged with the 10% strength by weight nanoparticle solution of preparation example 1. To this initial charge with stirring there were added the methacrylate copolymer (A2) from example 2. The resulting reaction mixture was stirred at room temperature for an hour. Then isopropanol was added and the reaction mixture obtained in this way was stirred at room temperature for four hours. During this time the reaction mixture, which originally had a milky turbidity, became clear and a translucent clearcoat material was formed.

Table 3 gives an overview of the material composition of the clearcoat materials 4.1 to 4.5 prepared in accordance with these general preparation instructions. They were readily transportable and storage-stable.

TABLE 3

The physical composition of clearcoat materials 4.1 to 4.5

| Constituents | Parts by weight in the clearcoat material: | | | | |
|---|---|---|---|---|---|
| | 4.1 | 4.2 | 4.3 | 4.4 | 4.5 |
| Nanoparticle solution of preparation example 1 | 1 | 1 | 1 | 1 | 1 |
| Solution of the methacrylate copolymer from (A2) from Example 1 | 3 | 3.5 | 4 | 4.5 | 5 |
| Water | 1.58 | 1.58 | 1.58 | 1.58 | 1.58 |
| Isopropanol | 1.58 | 1.58 | 1.58 | 1.58 | 1.58 |

Clearcoat materials 4.1 to 4.5 were applied pneumatically using gravity-feed cup-type guns to steel panels which had previously been coated with—above one another in the order stated—an electrocoat, a surfacer coat, and a black aqueous basecoat. The wet film thickness of the applied clearcoat films 4.1 to 4.5 was chosen so that the cured clearcoats had a dry film thickness of 20 μm. The applied clearcoat films 4.1 to 4.5 were flashed off at room temperature for 10 minutes and cured thermally at 140° C. for 22 minutes. Forced air ovens from Heraeus were used for the thermal cure.

This gave clear, high-gloss clearcoats 4.1 to 4.5 which showed very good leveling and were free from stress cracks and surface defects such as craters. The scratch resistance was investigated by the steel wool scratch test and the chemical stability by BART of the clearcoats 4.1 to 4.5 were investigated.

The BART (BASF ACID RESISTANCE TEST) was used to determine the resistance of a clearcoat to acids, alkalis, and water droplets. The clearcoat was exposed to a temperature load in a gradient oven after baking at 40° C. for 30 minutes. Beforehand the test substances (10% and 36% strength sulfuric acid; 6% strength sulfurous acid, 10% strength hydrochloric acid, 5% strength sodium hydroxide solution, DI (i.e. fully demineralized or deionized) water—1, 2, 3 or 4 droplets) were applied in a defined manner using a volumetric pipette. Following exposure to the substances, the substances were removed under running water and the damage was assessed visually after 24 h in accordance with a predetermined scale:

| Rating | Appearance |
|---|---|
| 0 | no defect |
| 1 | slight marking |
| 2 | marking/dulling/no softening |
| 3 | marking/dulling/color change/softening |
| 4 | cracks/insipient etching |
| 5 | clearcoat removed |

Each individual mark (spot) was evaluated and the result was stated in the form of a rating for each test substance.

Table 4 gives an overview of the results. They underscore the fact that the clearcoats 4.1 to 4.5 were stable toward chemicals, and highly scratch-resistant.

TABLE 4

The chemical stability and scratch resistance of clearcoats 4.1 to 4.5

| Test | Clearcoat material: | | | | |
|---|---|---|---|---|---|
| | 4.1 | 4.2 | 4.3 | 4.4 | 4.5 |
| Steelwool scratch test (rating) | 1-2 | 1-2 | 1-2 | 1-2 | 2 |
| BART | | | | | |
| 10% sulfuric acid | 0 | 0 | 0 | 0 | 0 |
| 36% sulfuric acid | 0 | 0 | 0 | 0 | 0 |
| 10% hydrochloric acid | 1 | 1 | 1 | 1 | 1 |
| 6% sulfurous acid | 0 | 0 | 0 | 0 | 0 |
| 5% NaOH solution | 0 | 0 | 0 | 0 | 0 |
| DI water | 0 | 0 | 0 | 0 | 0 |

Example 5

The Preparation of a Condensate of the Methacrylate Copolymer (A1)

A glass round-bottomed flask equipped with stirrer, reflux condenser, thermometer and external heating was charged with 1502.7 parts by weight of the methacrylate copolymer (A1) from example 1, 2693.7 parts by weight of isopropanol and 365.4 parts by weight of 0.1N acetic acid and this initial charged was heated at 70° C. with stirring for three hours. Subsequently 1394.4 parts by weight of Solventnaphtha® were added, after which the resulting reaction mixture was stirred at 70° C. for five minutes more. Thereafter, the low-boiling constituents, especially the water, were distilled off under reduced pressure at 70° C. (3737.9 parts by weight), to give 2218.3 parts by weight of the condensate. The residual water (0.2% by weight) and isopropanol (2.5% by weight) contents were determined by gas chromatography. The condensate was stable on storage at 40° C. for more than four weeks. It was outstandingly suitable for producing clearcoats.

Example 6

The Preparation of Two-Component Clearcoat Materials 6.1 and 6.2 And Production of Clearcoats 6.1 and 6.2

The two-component clearcoat material 6.1 was prepared by mixing 100 parts by weight of the condensate of examples 5 with 20 parts by weight of Decanol® EX-252 (product of Nagase Chemtex Corporation, Osaka, Japan) and 1 part by weight of a commercial leveling agent (Byk® 301 from Byk Chemie).

Two-component clearcoat material 6.2 was prepared using 30 parts by weight of Decanol® EX-252 instead of 20 parts by weight.

9.7 parts by weight of the catalyst from preparation example 1 were added to each of the resulting mixtures 6.1 and 6.2. The resulting two-component clearcoat materials 6.1 and 6.2 were applied pneumatically using gravity-freed cup-type guns to steel panels which previously had been coated with—lying above one another in the order stated—an electrocoat, a surfacer coat, and a black aqueous basecoat. The wet film thickness of the applied clearcoat films 6.1 and 6.2 is chosen so that the cured clearcoats 6.1 and 6.2 had a dry film thickness of 40 µm. The applied clearcoat films 6.1 and 6.2 were flashed off at room temperature for 10 minutes, dried at 60° C. for 5 minutes and cured thermally at 140° C. for 22 minutes. Forced air ovens from Heraeus were used for the thermal cure.

The scratch resistance of the clearcoats 6.1 and 6.2 was determined by means of the AMTEC carwash test. Their chemical stability was determined by means of the gradient oven test. The results are contained in Table 5. They underscore the high scratch resistance and chemical stability of the clearcoats 6.1 and 6.2.

TABLE 5

The scratch resistance and chemical stability of clearcoats 6.1 and 6.2

| Test | Clearcoat material: | |
|---|---|---|
| | 6.1 | 6.2 |
| Gradient oven test: Beginning damage after 24 hours (° C.) | | |
| Sodium hydroxide solution | 42 | >75 |
| Sulfuric acid | 46 | 47 |
| Distilled water | >75 | >75 |
| Pancreatin | 55 | 60 |
| Tree resin | >75 | >75 |
| AMTEC: Gloss at 20° to DIN 67530 (units): | | |
| Initial gloss | 83 | 84 |
| Gloss after damage: | | |
| Without cleaning | 54 | 50 |
| With cleaning | 64 | 76 |
| Residual gloss (%) | 77 | 80 |

What is claimed is:

1. A composition comprising at least one of hydrolysates or condensates of epoxy-and silane-functional oligomers and polymers, prepared by at least one of hydrolyzing or condensing at least one of an oligomer or polymer (A), wherein the oligomer or polymer (A) is selected from the group consisting of copolymers of olefinically unsaturated monomers, containing at least one epoxide group (a1) and at least one hydrolyzable silane group (a2), wherein the number-average molecular weight of the oligomer or polymer (A) is from 800 to 3000 daltons, wherein the hydrolyzing or condensing is conducted in the presence of nanoparticles having a primary particle size of from 5 to 50 nm, which nanoparticles are metals of oxides, oxide hydrates, sulfates, hydroxides or phosphates oxides, and wherein the metals are selected from the group consisting of boron, aluminum, gallium, silicon, germanium, tin, arsenic, antimony, silver, zinc, titanium, zirconium, hafnium, vanadium, niobium, tantalum, molybdenum, tungsten, and cerium, and wherein the hydrolysis and/or condensation takes place in a sol-gel process by reaction with water in the presence of an organic or inorganic acid.

2. The composition as claimed in claim 1, wherein the at least one oligomer or polymer (A) is condensed by means of a sol-gel process.

3. The composition as claimed in claim 1, prepared by at least one of hydrolyzing or condensing an oligomer (A).

4. The composition as claimed in claim 1, wherein the oligomer and the polymer (A) are (meth)acrylate copolymers.

5. The composition as claimed in claim 1, wherein the molar ratio of epoxide groups (a1) to hydrolyzable silane groups (a2) in the oligomer or polymer (A) is from 1.5:1 to 1:1.5.

6. The composition as claimed in claim 1, wherein the hydrolyzable silane groups (a2) have the general formula II:

$$-SiR_mR^1_n \qquad (II),$$

in which the indices and variables are defined as follows:
R is a monovalent hydrolyzable atom or monovalent hydrolyzable group;
$R^1$ is a monovalent nonhydrolyzable radical;
m is an integer from 1 to 3, and
n is 0 or 1 or 2
with the proviso that m+n=3.

7. The composition as claimed in claim 6, wherein the monovalent hydrolyzable atom R is selected from the group consisting of hydrogen, fluorine, chlorine, bromine, and iodine and the monovalent hydrolyzable group R is selected from the group consisting of hydroxyl groups, amino groups —$NH_2$, and groups of the general formula III:

$$R^1-X- \qquad (III),$$

in which the variables are defined as follows:
X is selected from the group consisting of oxygen atom, sulfur atom, carbonyl group, carboxyl group, thiocarboxylic S-ester group, thiocarboxylic O-ester group and amino group —NH— or —$NR^1$—,
$R^1$ is a monovalent organic radical comprising at least one of substituted aryl groups and unsubstituted aryl groups, alkyl, alkenyl or alkynyl groups selected from the group consisting of substituted, unsubstituted, branched, unbranched, cyclic and noncyclic groups.

8. The composition as claimed in claim 1 comprising oligomer and polymer (A) are prepared by copolymerizing at least one monomer (a1) containing at least one epoxide group (a1) with at least one monomer (a2) containing at least one hydrolyzable silane group (a2).

9. The composition as claimed in claim 8, wherein the monomers (a1) and (a2) are copolymerizable with at least one further monomer, (a3) other than (a1) and (a2).

10. The composition as claimed in claim 8, wherein the monomers (a1), (a2), and (a3) contain at least one olefinically unsaturated group.

11. The composition as claimed in claims 8, wherein the olefinically unsaturated groups are at least one of methacrylate or acrylate groups.

12. The composition as claimed in claim 8, wherein the oligomer and the polymer (A) are prepared by free-radical copolymerization of the monomers (a1), (a2), and (a3).

13. The composition as claimed in claim 8, wherein the monomer ratio, on a molar basis, of monomer ((a1)) to monomer (a2) is from 1.5:1 to 1:1.5.

14. A process for preparing the composition as claimed in claim 1, which comprises at least one of hydrolyzing or condensing the oligomers and/or polymers (A) at a pH<7.

15. The process as claimed in claim 14, wherein the at least one of hydrolysis or condensation is conducted in the presence of an organic acid.

16. The process as claimed in claim 14 or 15, wherein the at least one of hydrolysis or condensation is conducted at from −10 to +50° C.

17. The composition according to claim 1, wherein the (meth)acrylate copolymer (A) contains at least one of lateral or terminal epoxide groups (a1) and at least one of lateral or terminal hydrolyzable silane groups (a2) of the general formula II:

 (II), in which the indices and variables are as defined as:
R is a monovalent hydrolyzable atom or monovalent hydrolyzable group;
$R^1$ is a monovalent nonhydrolyzable radical;
m is an integer from 1 to 3, and
n is 0 or 1 or 2
with the proviso that m+n=3,
in a molar ratio (a1):(a2) of from 1.5:1 to 1:1.5.

18. The composition of claim 1 wherein the nanoparticles are cationically stabilized.

19. A composition comprising at least one of hydrolysates or condensates of epoxy-and silane-functional oligomers and polymers, prepared by at least one of hydrolyzing or condensing at least one of an oligomer or polymer (A), wherein the oligomer or polymer (A) is selected from the group consisting of copolymers of olefinically unsaturated monomers, containing at least one epoxide group (a1) and at least one hydrolyzable silane group (a2), wherein the number-average molecular weight of the oligomer or polymer (A) is from 800 to 3000 daltons, and wherein the hydrolyzing or condensing is conducted in the presence of nanoparticles having a primary particle size of from 5 to 50 nm, which nanoparticles are the nanoparticles are cationically stabilized oxides, oxide hydrates, or hydroxides of aluminum or silicon, and wherein the hydrolysis and/or condensation takes place in a sol-gel process by reaction with water in the presence of an organic or inorganic acid.

20. The composition of claim 19 wherein the nanoparticles are cationically stabilized oxides, oxide hydrates, or hydroxides of aluminum.

21. The composition of claim 20 wherein the hydrolysis and/or condensation takes place in a sol-gel process by the reaction with water in the presence of acetic acid.

\* \* \* \* \*